(12) United States Patent
Christmas

(10) Patent No.: US 11,736,667 B2
(45) Date of Patent: Aug. 22, 2023

(54) PROJECTOR FOR FORMING IMAGES ON MULTIPLE PLANES

(71) Applicant: Dualitas Ltd, Milton Keynes (GB)

(72) Inventor: Jamieson Christmas, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 453 days.

(21) Appl. No.: 17/119,715

(22) Filed: Dec. 11, 2020

(65) Prior Publication Data

US 2021/0195146 A1    Jun. 24, 2021

(30) Foreign Application Priority Data

Dec. 20, 2019    (GB) ..................................... 1918966

(51) Int. Cl.
*H04N 9/31*    (2006.01)
*G02B 27/01*    (2006.01)

(52) U.S. Cl.
CPC ....... *H04N 9/3105* (2013.01); *G02B 27/0103* (2013.01); *G02B 2027/0105* (2013.01); *G02B 2027/0109* (2013.01)

(58) Field of Classification Search
None
See application file for complete search history.

(56) References Cited

U.S. PATENT DOCUMENTS

| | | | | |
|---|---|---|---|---|
| 10,317,684 | B1* | 6/2019 | Lee | G06V 20/653 |
| 2011/0157667 | A1 | 6/2011 | Lacoste et al. | |
| 2018/0220127 | A1* | 8/2018 | Khan | H04N 13/395 |
| 2019/0121291 | A1 | 4/2019 | Leister et al. | |
| 2020/0142356 | A1 | 5/2020 | Gilles et al. | |
| 2021/0055691 | A1* | 2/2021 | Wengierow | G02B 27/0172 |
| 2021/0191320 | A1* | 6/2021 | Bledowski | G03H 1/2205 |
| 2022/0075200 | A1* | 3/2022 | Luo | G02B 27/1086 |
| 2022/0317463 | A1* | 10/2022 | Urey | G02B 27/0018 |

FOREIGN PATENT DOCUMENTS

| | | |
|---|---|---|
| CN | 107024849 A | 8/2017 |
| GB | 2574058 A | 11/2019 |
| GB | 2578523 A | 5/2020 |
| WO | 2019/001968 A1 | 1/2019 |

OTHER PUBLICATIONS

UKIPO Combined Search and Examination Report under Sections 17 and 18(3), GB Application No. 1918966.1, dated Jun. 15, 2020, 6 pages.

* cited by examiner

*Primary Examiner* — Fred Tzeng
(74) *Attorney, Agent, or Firm* — McDonnell Boehnen Hulbert & Berghoff LLP

(57) ABSTRACT

A projector arranged to form a plurality of image reconstructions on different planes disposed on a common projection axis and a corresponding method is disclosed. A hologram engine is arranged to determine a hologram corresponding to each image for image reconstruction, and to form a diffractive pattern including the corresponding hologram for each image. A display engine is arranged to display each diffractive pattern and receive light such that an image reconstruction corresponding to each hologram is formed on a plane of the plurality of different planes. Each image reconstruction comprises image spots arranged in a pattern. Image spots of a first image reconstruction formed on a first plane are interposed between image spots of a second image reconstruction formed on a second plane.

20 Claims, 11 Drawing Sheets

PROJECTOR FOR FORMING IMAGES ON MULTIPLE PLANES

CROSS-REFERENCE TO RELATED APPLICATIONS

This application claims the benefit of priority of United Kingdom Patent Application no. 1918966.1, filed Dec. 20, 2019, which is hereby incorporated herein by reference in its entirety.

FIELD

The present disclosure relates to a projector. More specifically, the present disclosure relates to a holographic projector, a method of holographic projection and a holographic projection system. Some embodiments relate to a head-up display and a head-mounted display. Some embodiments relate to a projector arranged to form a plurality of image reconstructions on different planes disposed along a common projection axis and a corresponding method.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A moving diffuser may be used to improve image quality in devices which use coherent light such as holographic projectors.

SUMMARY

Aspects of the present disclosure are defined in the appended independent claims.

There is provided a projector arranged to form a plurality of image reconstructions on different planes disposed on a common projection axis. The image reconstructions are directly viewable by a viewer. For example, the image reconstructions are viewed in a direction substantially parallel to the common projection axis from an eye box. In embodiments, the image reconstructions appear at the same distance or depth from the viewer. In other examples, some of the different image reconstructions appear at different distances or depths from the viewer. The different image reconstructions may be perceived by the viewer as a composite or combined image. The projector comprises a hologram engine and a display engine. The hologram engine is arranged to determine a hologram corresponding to each image for image reconstruction. The hologram engine is further arranged to form a diffractive pattern including a hologram for the image reconstructions or a hologram for each image reconstruction. The display engine is arranged to display diffractive patterns and receive light such that at least one image reconstruction corresponding to each hologram is formed on a plane of the plurality of different planes. Each image reconstruction comprises image spots arranged in a pattern. Image spots of a first image reconstruction formed on a first plane are interposed between image spots of a second image reconstruction formed on a second plane.

Accordingly, image spots of a first image reconstruction formed on a first plane are interposed between image spots of a second image reconstruction formed on a second plane in two dimensions—the (first and second) dimensions of the first and second planes (e.g. x, y). In addition, image spots of the first image reconstruction are spatially separated from image spots of the second image reconstruction in the third dimension—the dimension of (or parallel to) the common projection axis (e.g. z). It may be said that image spots of the first image reconstruction are spatially interposed between image spots of the second reconstruction in three dimensions.

Embodiments of the present disclosure may be implemented using a "direct view" configuration—that is, an optical configuration in which the viewer looks directly at the display device (e.g. spatial light modulator). In these embodiments, image reconstructions are not formed on an intermediate screen (e.g. diffuser) and the viewer receives light directly from the display device. In these cases, when the hologram is a Fourier or Fresnel hologram, it is sometimes said that the lens of the viewer's eye performs a Fourier transform of the displayed hologram. In some embodiments, image reconstructions are formed in free space between the display device and viewer, and the viewer is able to focus on these planes during display.

Some embodiments of the present disclosure may also be implemented using an "indirect view" configuration in which image reconstructions are formed on a screen or screens. The screen may be moveable such that each image reconstruction is focused on a corresponding screen. Alternatively, a plurality of switchable screens may be used such as described in WO/2015/173556 wherein a stack of parallel, switchable screens are each operated in a transmissive or diffuse mode using a liquid crystal. An image reconstruction is only visible if the corresponding screen is operated in the diffuse mode. In some embodiment, only one screen at a time is operated in the diffuse mode. In other embodiments, more than one screen is operated in the diffuse mode at the same time. The person skilled in the art will appreciate that some embodiments described herein are not suitable for such as scheme.

Regardless of the viewing configuration, the viewer sees the superimposed content of a plurality of different image reconstructions. Whilst different image reconstructions are formed on different display planes, the distance between the display planes is sufficiently small that the viewer cannot tell that the reconstructions are on different planes on a common projection axis. In embodiments, the viewer perceives a single, composite image formed of at least a first and second component (or partial) image reconstruction of the same target image. In some embodiments, a holographic projector forms a plurality of holographic reconstructions on different replay planes along the projection axis thereof. Image reconstructions (which are actually on different planes) are therefore seen by the viewer as a "whole" image. The different planes are sufficiently close that a viewer sees a composite image, comprising the plurality of two-dimensional image reconstructions, appearing to have been formed on the same plane. It may be said that the different image reconstructions appear coplanar. In some embodiments, the configuration is such that a viewer is not provided with any visual cues that change the perception of coplanarity. In some embodiments, at least one of the partial images is processed before hologram calculation in order to ensure there are no different depth cues. For example, a first image reconstruction on a first plane may be scaled in size to ensure that it appears coplanar with a second image reconstruction that is actually formed on a second plane. This type of image processing is within the capabilities of the person skilled in the art of image display and a detailed description of image scaling is not therefore provided herein.

Each image reconstruction comprises a plurality of image spots formed on the respective plane. However, viewing difficulties may arise if two or more image reconstructions formed on different planes include image spots at equivalent spatial positions on their respective two-dimensional planes. It may be said that equivalent spatial positions have substantially the same coordinates (e.g., x, y) of a two-dimensional coordinate system, in which the origin of the coordinate system is defined by the position of the common projection axis (e.g. at the centre of each plane). In particular, image spots formed at the same two-dimensional spatial positions but on different planes may not be entirely visible since they coincide or are entirely overlapping in the composite image. This is a consequence of the parallel arrangement of the planes along the common projection axis.

The inventors have disclosed herein an approach involving interposing image spots of different image reconstruction formed on different planes. In particular, image spots of a first image reconstruction formed on a first plane are interposed between, and thus spatially separated from, image spots of a second image reconstruction formed on a second plane. Thus, image spots of different image reconstructions are not formed at equivalent two-dimensional spatial positions so as to coincide or overlap in the composite image seen by the viewer. It may be said that the image spots of different image reconstructions are spatially separated in the first and second dimensions (x, y) of their respective parallel image planes, and thus in the plane of the composite two-dimensional image. In addition, the image spots of different image reconstruction are spatially separated in the third dimension (z) of the common projection axis. Thus, the viewer is able to see the composite image (which appears to be formed on a single plane but comprises the different image reconstruction formed on different planes) more clearly, as described further below. The present disclosure addresses the technical problem of image pixel crosstalk, as also described further below.

The hologram engine is arranged to form a diffractive pattern including the hologram/s corresponding to a plurality of image reconstructions, wherein the diffractive pattern determines the plane/s of the image reconstruction/s. In some embodiments, the hologram engine forms a diffractive pattern including a lens function having a focal length. The focal length of the lens function may influence the position of the planes of the image reconstructions on the common projection axis (e.g. distance from the spatial light modulator along the axis of the projection path—referred to herein as the "propagation distance").

The first image reconstruction and second image reconstruction are formed at substantially the same time. In some embodiments, the first image reconstruction and second image reconstruction are formed simultaneously. In other examples, the first image reconstruction and second image reconstruction are formed one after the other in rapid succession.

In embodiments, the image spots of the first image reconstruction are arranged in a first pattern and the image spots of the second image reconstruction are arranged in a second pattern, wherein the first pattern is opposite to the second pattern. For example, the first pattern may be a first checkerboard pattern and the second pattern may be a second checkerboard pattern opposite to the first checkerboard pattern. Thus, the image spots of the first image reconstruction fill in the gaps between the image spots of the second image reconstruction and vice versa.

The projector may be arranged to form a sequence of image reconstructions on the first plane by alternating between image spots arranged in the first pattern and image spots arranged in the second pattern. The projector may be further arranged to form, in synchronization with the sequence of image reconstructions formed on the first plane, a sequence of image reconstructions on the second plane by alternating between image spots arranged in the second pattern and image spots arranged in the first pattern.

In some embodiments, the projector may be arranged to form image reconstructions of a single colour to display monochromatic images. In this case, the first image reconstruction and the second image reconstruction are single colour image reconstructions having the same colour.

In other embodiments, the projector may be arranged to form image reconstructions of different colours, in order to display polychromatic images. In some embodiments, each image reconstruction on the first/second plane is a single colour but successive image reconstructions of a sequence of image reconstructions formed on the first/second plane are different colours. In other examples, the first image reconstruction formed on the first plane and the second image reconstruction formed at substantially the same time on the second plane may have different colours. In these examples, at any point in time, the colour of the image spots formed on the first plane is different to colour of the image spots formed on the second plane.

In embodiments, the first image reconstruction is a first holographic reconstruction and the second image reconstruction is a second holographic reconstruction. In consequence, the first plane is a first replay plane and the second plane is a second replay plane.

In some embodiments, the projector further comprises an image processing engine. The image processing engine is arranged to receive a plurality of source images. The image processing engine is further arranged to process each source image in accordance with a sampling scheme selected from a plurality of different sampling schemes in order to reduce the number of image pixels formed on each replay plane. The pattern of image spots of each image reconstruction formed by the display engine is determined by the corresponding sampling scheme. A first sampling scheme associated with the first image reconstruction is different to a second sampling scheme associated with the second image reconstruction such that the image spots of the first image formed on the first plane are interposed between the image spots of the second image formed on the second plane.

By sampling each source image in accordance with a sampling scheme, a hologram may be calculated to form an image reconstruction comprising a group or subset of image spots of the image arranged in a pattern. Accordingly, the spacing between image spots in the pattern of image spots formed on each replay plane may be increased.

Technical advancements in accordance with the present disclosure may be understood from the following. Notably, some embodiments of the present disclosure relate to interlacing in space/depth in order to address the problem of pixel crosstalk in the holographic image. It is found that the formation of adjacent, closely spaced image spots (i.e. in the array of image spots) at the same time can cause pixel crosstalk or interpixel interference, thereby reducing image quality. In accordance with embodiments of this disclosure, pixel crosstalk is reduced, or even eliminated, by increasing the spacing between image spots on the replay field. However, the perceived resolution of the holographic image is retained by interposing image spots on a second holographic replay plane. Image pixels on the first plane do not interfere with image spots on the second plane. The first holographic reconstruction on the first plane comprises image spots arranged in a first checkerboard pattern and the second holographic reconstruction on the second plane comprises image spots arranged in a second checkerboard pattern. The first checkerboard pattern is complementary to the second checkerboard pattern. Image spots of the second holographic reconstruction are perceived between image spots of the first holographic reconstruction such that there is no apparent loss of resolution. However, interpixel crosstalk in the holographic image is reduced.

A first checkerboard and second checkerboard of a source image for projection are formed. For example, image pixels of the source image may be sampled in accordance with a sampling scheme comprising the first checkerboard pattern and the second checkerboard pattern, to derive the first and second checkerboards of the source image. A single hologram may be calculated that forms image reconstructions of the first checkerboard and second checkerboard at the same time. The single hologram may be a dual plane hologram such as a Fresnel hologram or a dual-plane hologram calculated using a dual-plane Gerchberg-Saxton algorithm. Alternatively, a first hologram channel may be used to form a first image reconstruction of the first checkerboard on the first plane and a second hologram channel may be used to form a second image reconstruction of the second checkerboard on the second plane. The first holographic projection channel and second holographic projection channel may be substantially colinear. The first image reconstruction and second image reconstruction are formed on the same projection axis. Image spots of the first reconstruction and second reconstruction may be the same colour. Each reconstruction may be composed of red, green and blue image pixels formed from a first red, green and blue holographic projection channel.

Notably, in some embodiments, a plurality of holographic replay fields (on different replay planes) are simultaneously formed using the same hologram (e.g. Fresnel hologram) or using two holographic projection channels per colour or by displaying two different holograms (e.g. two different Fourier holograms combined with different lensing functions) on each single-colour spatial light modulator, at the same time.

The image processing engine may be arranged to upscale a source image before processing in accordance with a sampling scheme. The image processing engine may be arranged to change the size of the (optionally upscaled) source image before forming one of the first and second checkerboards, so that the first and second image reconstructions appear to be formed on the same plane (i.e. at the same depth from the viewer) even though they are formed on different planes.

In some embodiments, the first sampling scheme comprises nulling alternate pixel values in accordance with a first checkerboard pattern and the second sampling scheme comprises nulling alternate pixel values in accordance with a second checkerboard pattern, wherein the first checkerboard pattern is opposite to the second checkerboard pattern. Accordingly, in accordance with the first and second sampling schemes, every other pixel value of a row/column is sampled and the remaining pixel values are zero.

In some embodiments, each sampling scheme comprises averaging pixel values within a sampling window at a plurality of sampling window positions. For example, the averaging may be a weighted averaging based on the position of the pixels within the sample window. For instance, the weighting given to each pixel value in the respective sampling window decreases with distance from the centre of the sampling window. In some examples, the first sampling scheme comprises a first set of sampling window positions and the second sampling scheme comprises a second set of sampling window positions, wherein the first set of sampling window positions is diagonally offset from the second set of sampling window positions. The first set of sampling window positions may partially overlap the second set of sampling window positions.

In other embodiments, the hologram engine is arranged to form a diffractive pattern having a phase-ramp function. The ramp gradient of a first phase-ramp function associated with the first image reconstruction is different to the ramp gradient of a second phase-ramp function associated with the second image reconstruction in order to provide a displacement between the image spots of the first image reconstruction relative to the image spots of the second image reconstruction. Thus, the different first and second ramp gradients enable the image spots of the first image reconstruction to be spatially displaced relative to the image spots of the second image reconstruction. In such embodiments, sub-sampling of the source image may not be required. In examples, the difference between the ramp gradient of the first phase-ramp function and the ramp gradient of the second phase-ramp function is such that the image spots of the first image formed on the first plane are interposed between the image spots of the second image formed on the second plane.

There is further provided a head-up display comprising the projector as disclosed herein There is further provided a method of holographic projection using the projector as disclosed herein.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels". The image spots are light spots formed in the replay field. Thus, the terms "image spots" and "image pixels" refer to discrete spots or points of light, constituting the holographic reconstruction, that are formed in the replay field on the replay plane. As the skilled person will appreciate, each image spot or image pixel represents a smallest resolvable element of the holographic reconstruction formed on the replay plane.

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

In the following description, the term "image" is used herein to refer to a desired image (also called a "target image", which may be derived from a "source image"). The term "image reconstruction" refers to the reconstruction of a desired image or target image on a plane. Thus, in the context of holographic display devices, the term "image reconstruction" refers to a "holographic reconstruction". The term "image" may also be used herein as a shorthand for "image reconstruction" when referring to an image formed on a plane. As noted previously, an "image reconstruction" may comprise a pattern of discrete spots or points of light called "image spots" or "image pixels".

The term "display event" conventionally refers to the time interval in which a single image reconstruction is formed on a display plane. In the context of holographic display devices as described herein, this corresponds to the time interval that a single hologram written to a spatial light modulator is displayed. A display event may correspond to the display of a frame or sub-frame of a video image. In the following description, the term "display event" is also used to refer to the time interval in which a plurality of image reconstructions are synchronously formed on different planes at substantially the same time.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
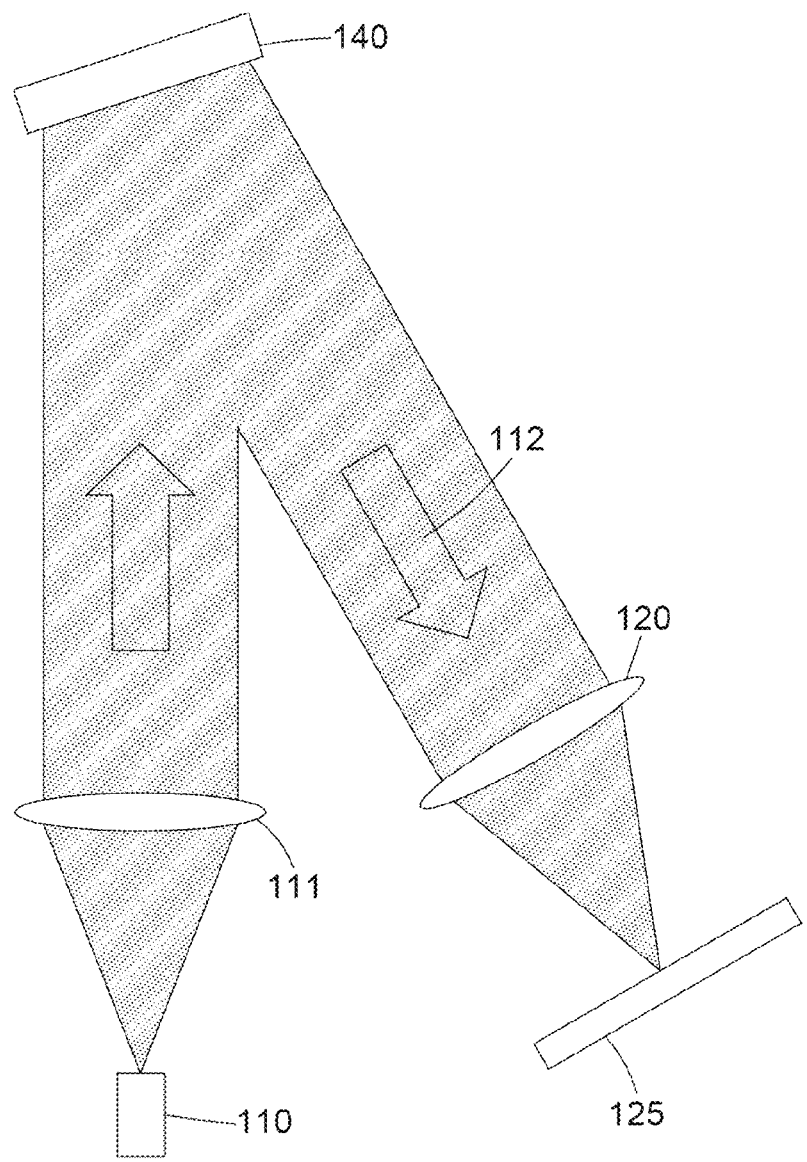
FIG. 1 is a schematic showing a reflective SLM producing a holographic reconstruction on a screen.

FIG. 1 shows an arrangement in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this arrangement, the spatial light modulator is a reflective liquid crystal on silicon, "LCOS", device. The hologram is encoded on the spatial light modulator and a holographic reconstruction is formed at a replay field, for example, a light receiving surface such as a screen or diffuser. In an alternative arrangement, in accordance with the present disclosure, the viewer looks directly at the spatial light modulator displaying the hologram, and the light receiving surface is omitted. Instead, the holographic reconstruction is formed at a position in free space or the holographic reconstruction is formed on the retina of the viewer's eye.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other arrangements, the generally planar wavefront is provided at normal incidence and a beam splitter arrangement is used to separate the input and output optical paths. In the arrangement shown in FIG. 1, light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these arrangements, the position of the holographic reconstruction in space is determined by the dioptric (focusing) power of the Fourier transform lens. In the arrangement shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. In embodiments, a hologram engine is used to calculate the computer-generated hologram using any suitable technique or algorithm. Examples of algorithms for calculating computer-generated holograms are described below.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
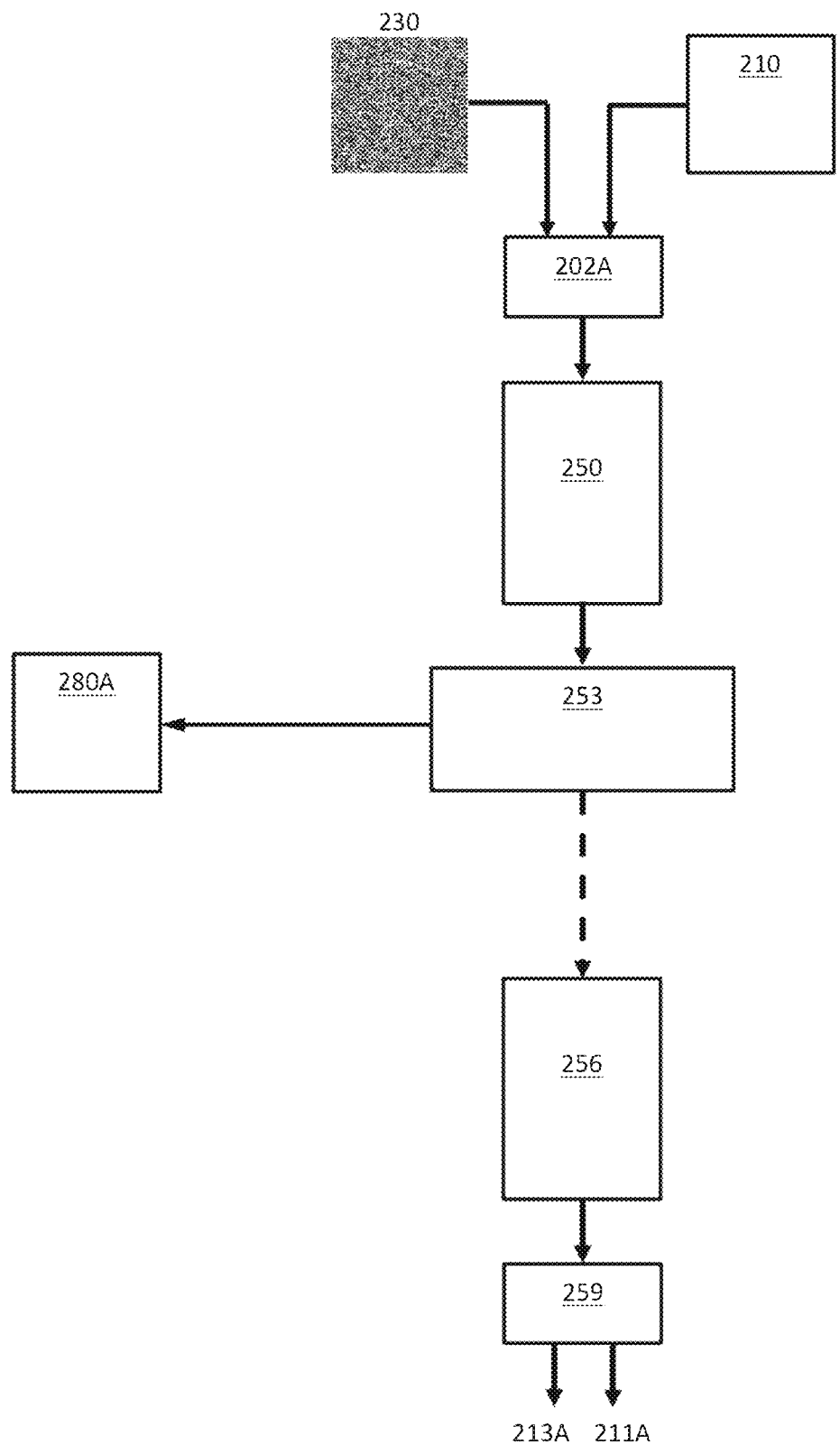
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
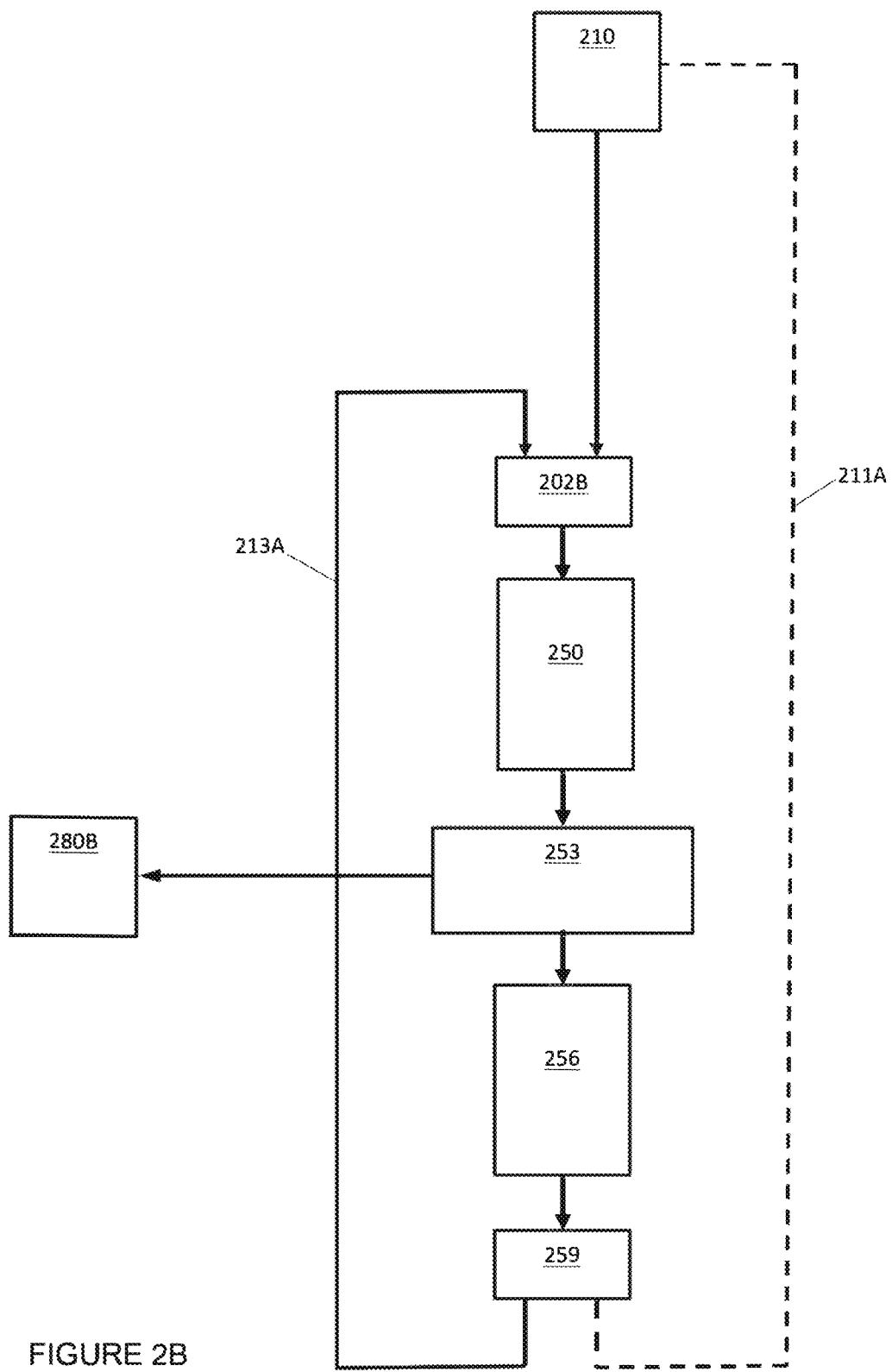
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
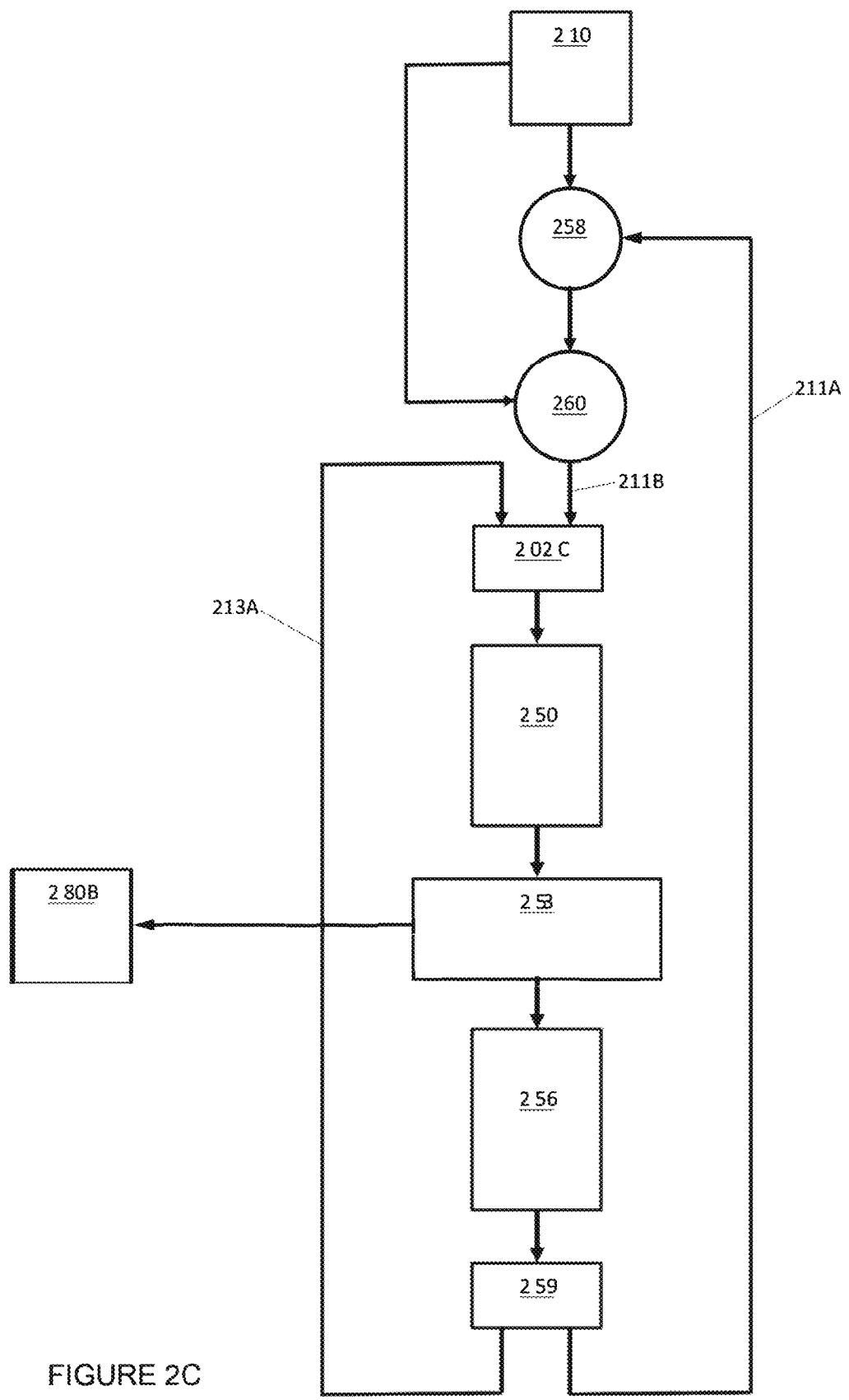
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210.

This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. For example, an image processing engine may receive and process a source image corresponding to a desired or target image, and a hologram engine may calculate a hologram corresponding to the image output by the image processing engine. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. Some embodiments relate to holograms that form reconstructions on a plurality of planes at the same time. Such holograms may be Fresnel holograms or holograms calculated using a multiplane Gerchberg-Saxton algorithm. The present disclosure is also applicable to holograms calculated by other techniques such as those based on point cloud methods.

Light Modulation

A spatial light modulator may be used to display the diffractive pattern including the computer-generated hologram. For example, the diffractive pattern may comprise a hologram representing a desired image and, optionally, a software lens or the like (e.g. grating/phase-ramp function) that determines the position of the image reconstruction, as described herein. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
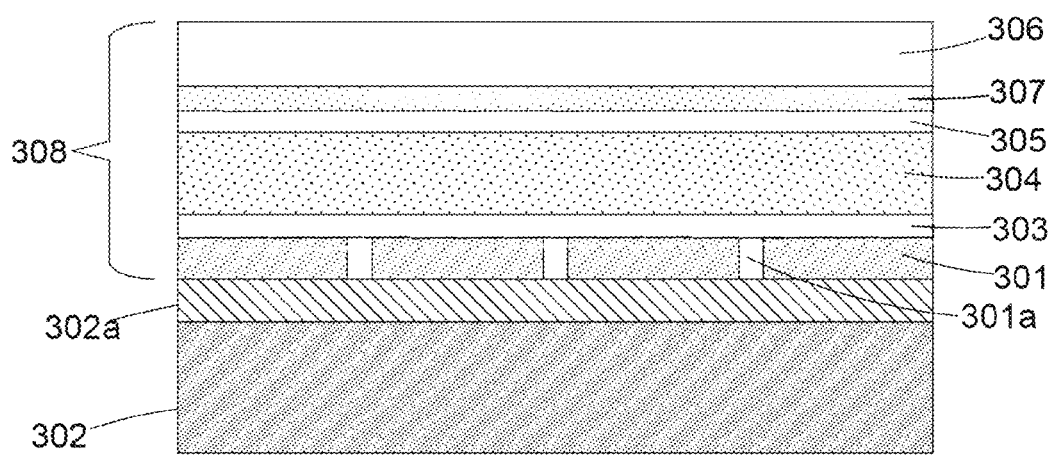
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Forming Multiple Image Reconstructions on Multiple Planes

Figure 4A:
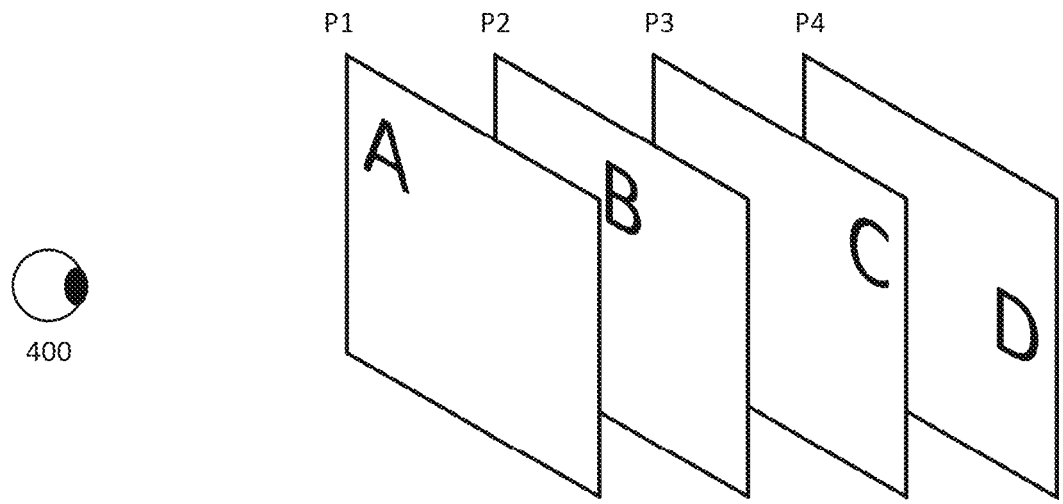
FIG. 4A shows an example of a plurality of image reconstructions, formed on respective planes disposed along a common projection axis, arranged with respect to a viewer.
Figure 4B:
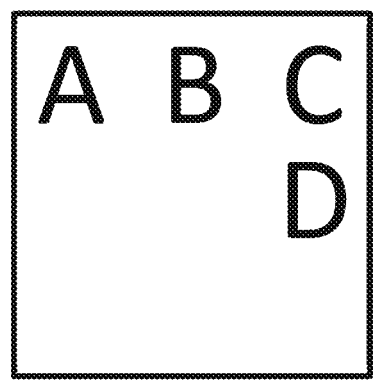
FIG. 4B shows a composite image comprising the plurality of image reconstructions of FIG. 4A as seen by the viewer.

FIG. 4A illustrates an example of a plurality of four target images (i.e. image reconstructions) formed at different planes, arranged with respect to a viewer 400. In particular, a first image "A" is formed at a first plane "P1", a second image "B" is formed at a second plane "P2", a third image "C" is formed at a third plane "P3" and a fourth image "D" is formed at a fourth plane "P4". The planes P1 to P4 are disposed at different positions along a common projection axis (not shown). Thus, the planes P1 to P4 are arranged parallel to each other and normal to the projection axis, which extends through the centre of each plane P1 to P4. First plane P1 is located at the largest distance along the projection axis from the spatial light modulator (not shown) and fourth plane P4 is located at the smallest distance along the projection axis from the spatial light modulator. FIG. 4B shows the composite image perceived by the viewer comprising the first image A, second image B, third image C and fourth image D of FIG. 4A. The second image B, third image C and fourth image D may be resized to avoid causing any perception of depth. For ease of illustration, the plurality of images A to D are formed at spatially separated positions (i.e. x, y coordinate positions) in their respective two-dimensional planes such that the images do not coincide or overlap in the composite image seen by the viewer. In other examples, the plurality of images may be formed at positions in their respective planes so that they are adjacent, but at least non-overlapping, in the composite image seen by the viewer.

As described above, when a spatial light modulator displays a hologram, a holographic reconstruction (i.e. image reconstruction) is formed on at least one plane, wherein each image reconstruction comprises image spots or image pixels. In particular, a set of image spots, arranged in an array, may be selectively formed on at least one replay plane.

The inventors have found that the quality of an image reconstruction may be improved by forming (i.e. displaying) different groups or subsets of image spots thereof on different planes. In particular, image quality may be improved by spatially-multiplexing the display of different groups or subsets of image spots. Different subsets of the array of image spots are formed on different planes. In particular, adjacent image spots on each plane are more widely spaced than adjacent image spots in the complete, perceived array of image spots. Displaying different subsets of image spots in patterns having fewer and more widely spaced image spots on different planes in rapid succession or at substantially the same time) improves image quality. For instance, arrays of image spots having opposite checkerboard patterns may be displayed on different planes. This approach avoids the formation of adjacent, closely spaced image spots (i.e. in the array of image spots of the image reconstruction) on the same plane, and, in consequence is found to reduce pixel crosstalk or interpixel interference, thereby improving image quality. No deterioration in image quality arises from the display of subsets of image spots, since all the image spots of a target image are perceived by the human eye. Thus, a full resolution image reconstruction is seen by the viewer.

Figure 6:
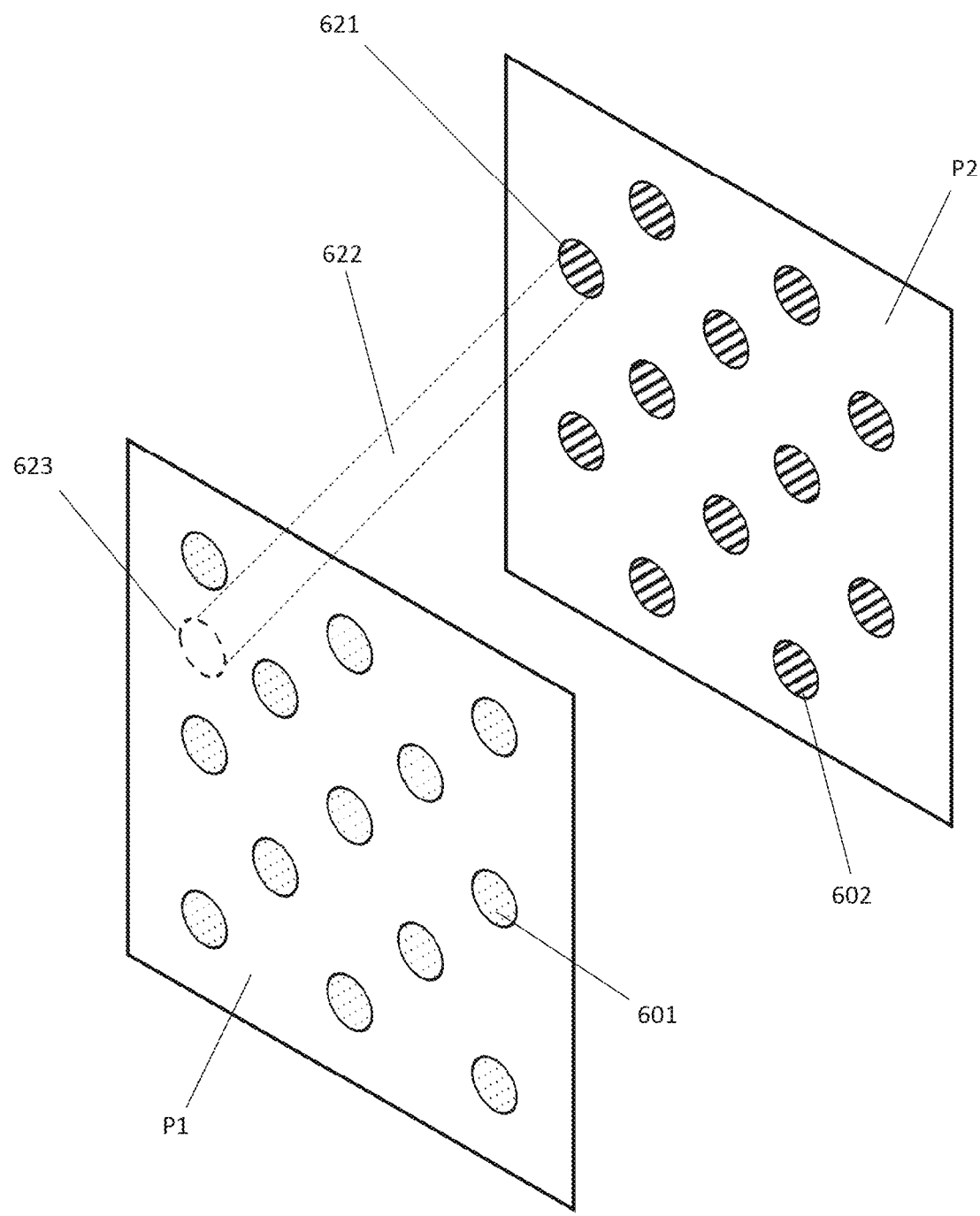
FIG. 6 shows the first image reconstruction of FIG. 5A formed on a first plane and the second image reconstruction of FIG. 5B formed on a second plane.
Figure 7:
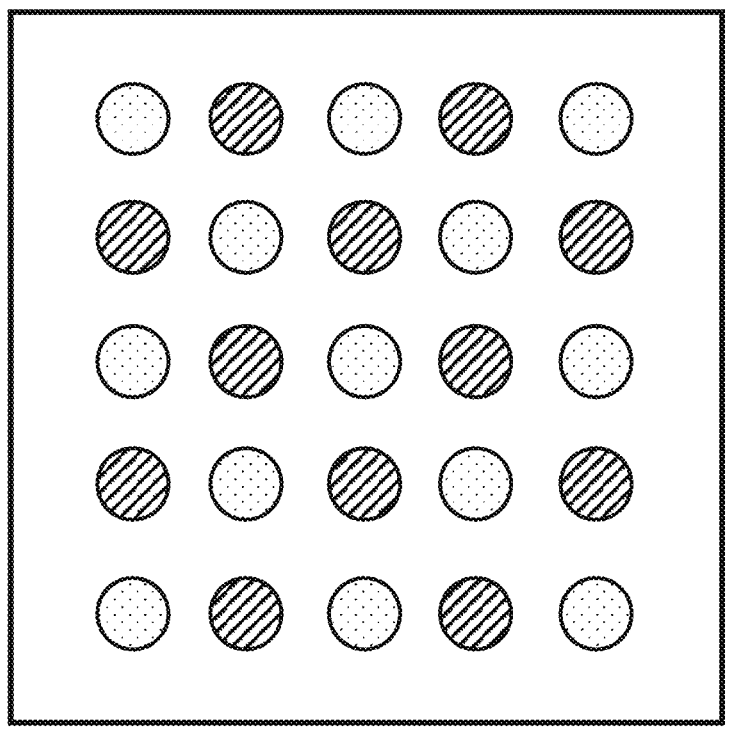
FIG. 7 shows the composite image comprising the first and second image reconstructions of FIG. 6 as seen by a viewer.

In accordance with embodiments of the present disclosure, a plurality of image reconstructions are synchronously formed on different planes at the substantially the same time. FIGS. 5 to 7 show an example of the display of subsets of image spots of the same target image formed on different planes, each arranged in a checkerboard pattern, in accordance with embodiments. The present disclosure is not limited to the use of patterns of image spots arranged in checkerboard patterns. On the contrary, various other patterns of image spots that enable interposing of image spots, as described herein, are possible and contemplated.

Figure 5A:
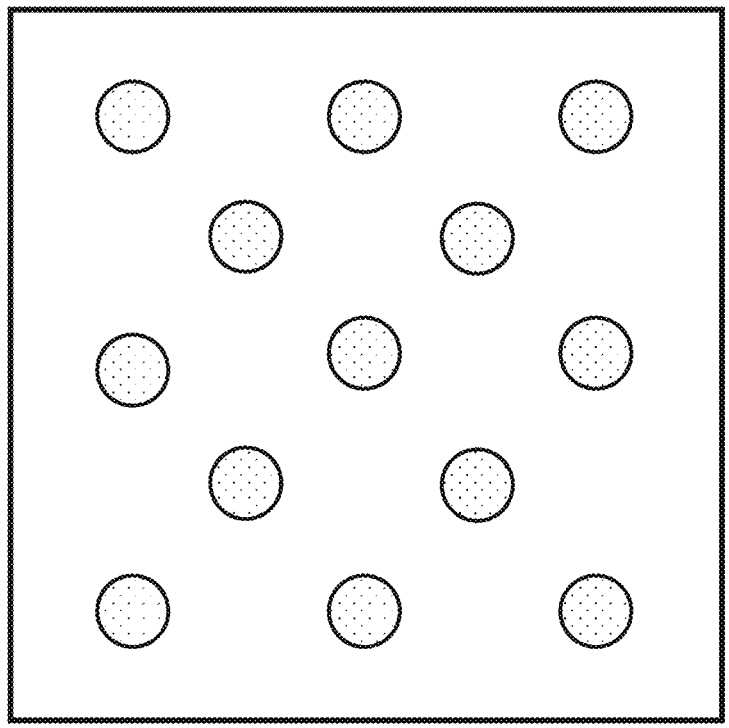
FIG. 5A shows a first pattern of image spots of a first image reconstruction.
Figure 5B:
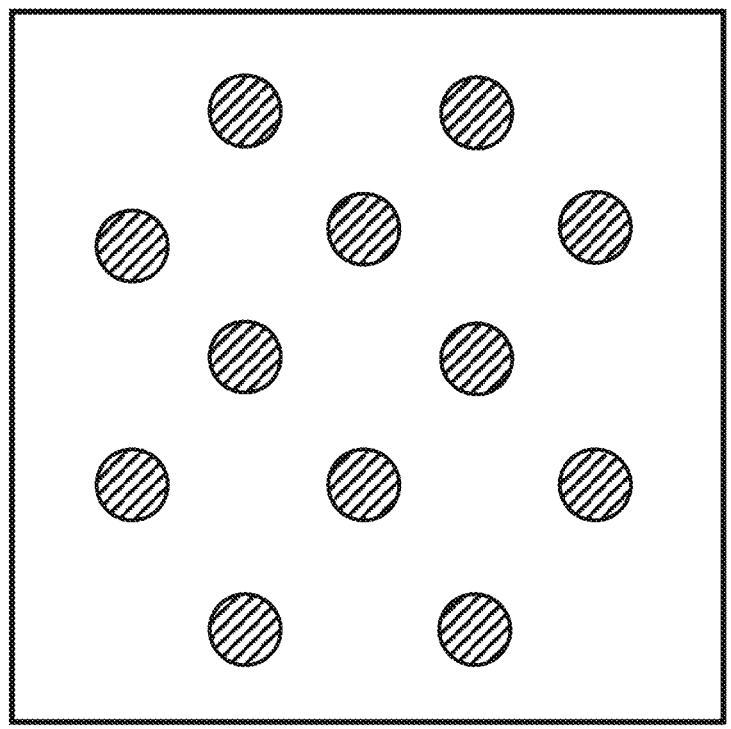
FIG. 5B shows a second pattern of image spots of a second image reconstruction, in accordance with embodiments.

FIG. 5A shows first image spots of a first image reconstruction and FIG. 5B shows second image spots of a second image reconstruction. First image spots comprise a subset of image spots arranged in a first pattern and second image spots comprise a subset of image spots arranged in a second pattern. In the illustrated example, the set of image spots that can be formed by the spatial light modulator in the replay field is a 5×5 array of image spots (i.e. the combination of the first image spots and the second image spots). It will be appreciated that, in practice, a spatial light modulator forms an image reconstruction comprising a much larger array of image spots. In addition, it will be appreciated that the values of the image spots are not illustrated in FIGS. 5A and 5B, meaning, for example, that some of the illustrated image spots may have a zero value and so may not appear as light spots in the image reconstruction.

The first pattern of image spots of FIG. 5A comprises a first checkerboard pattern and the second pattern of image spots of FIG. 5B comprises a second checkerboard pattern, wherein the first pattern is opposite to (i.e. the inverse of) the second checkerboard pattern. For example, the first pattern comprises a first subset of image spots arranged in a first checkerboard pattern (e.g. corresponding to black squares of a checkerboard) and the second pattern comprises a second subset of image spots arranged in a second (opposite) checkerboard pattern (e.g. corresponding to white squares of a checkerboard). Thus, each of the first and second patterns comprises a reduced number of image spots of the array of image spots (i.e. a subset of the 5×5 array of image spots).

In accordance with embodiments, first and second image reconstructions of the same target image are synchronously formed at respective first and second planes as shown in FIGS. 6 and 7. In particular, first and second image reconstructions are formed substantially simultaneously so that they are perceived as coplanar by the human eye. The image used to calculate one of the first and second holograms may be resized by an amount based on the distance between the first and second planes, so that the first and second image reconstructions appear to be coplanar. The first and second images reconstructions are formed or displayed at the same time (e.g. by synchronously displaying respective first and second single plane holograms at substantially the same time on respective first and second arrays of the same or different spatial light modulators or displaying a dual plane hologram on a spatial light modulator).

As shown in FIG. 6, first image spots 601 are formed on first plane P1, and second image spots 602 are formed on second plane P2, wherein first plane P1 and second plane P2 are arranged in parallel along a common projection axis (not shown). Since each of the first and second image spots comprises a subset of image spots of the same target image arranged in a checkerboard pattern, the spacing between adjacent image spots on the respective plane is increased by a factor of two (i.e. compared to the spacing between adjacent image spots of the 5×5 array). Furthermore, since first image spots 601 and second image spots 602 are arranged in opposite checkerboard patterns, when the composite image is viewed, second image spots 602 are interposed between first image spots 601. It may be said that second image spots 602 fill in the gaps between the first image spots 601 in the composite two-dimensional image. In particular, as shown in FIG. 6, image spot 621 of second image spots 602 formed on second plane P2 is interposed between three of the first image spots 601 formed on first plane P1 at position 623. Thus, first image spots 601 of a first image reconstruction formed on first plane P1 are spatially separated from, and interposed between, second image spots 602 of a second image reconstruction formed on second plane P2. It may be said that the coordinate positions of first image spots 601 and the second image spots 602 (as defined by the two-dimensional coordinate system (x, y) of their respective planes) are displaced or offset from each other so that the first and second image spots are interposed and spatially separated. FIG. 7 shows the composite image, comprising first image spots 601 of first image reconstruction formed on plane P1 and second image spots 602 of second image reconstruction formed on plane P2 of FIG. 6, as seen by a viewer.

There is provided a method of image projection, the method for forming a plurality of image reconstructions on different planes disposed on a common projection axis. The method comprises determining at least one hologram corresponding to a target image for image reconstruction. The method further comprises forming a diffractive pattern including the corresponding hologram. The method comprises displaying each diffractive pattern using a display engine. The method further comprises illuminating the display engine with light and forming an image reconstruction corresponding to each hologram on a plane of the plurality of different planes, wherein each image reconstruction comprises image spots arranged in a pattern, and wherein image spots of a first image reconstruction formed on a first plane are interposed between image spots of a second image reconstruction formed on a second plane.

Accordingly, there is disclosed spatial interposing or interlacing of image spots of two-dimensional image reconstructions formed on different planes in the third dimension—extending in the direction of the projection axis. The principles of spatial interposing of image spots in three dimensions may be applied to image spots of the same colour (e.g. in the case of forming monochromatic images) and to image spots of different colours (e.g. in the case of forming polychromatic (full colour) images). Examples are described below.

Hologram Calculation for Checkerboarding

In the embodiment described above with reference to FIGS. 5 to 7, each image reconstruction comprises a subset of the image spots of a single desired or target image arranged in a checkerboard pattern. This is referred to herein as "checkerboarding". An individual hologram (e.g. dual-plane hologram forming image spots having opposite checkerboarding patterns on different planes) displayed, at a single point in time, on the spatial light modulator reconstructs the complete target image but across two planes. Alternatively, two individual holograms (e.g. a pair of holograms forming image spots having opposite checkerboarding patterns on respective planes) may together reconstruct the complete target image across the two planes. It may be said that a subset of image spots corresponding to a partial image reconstruction of the target image is formed on each plane. Various techniques for calculating holograms that form partial image reconstructions of a target image are possible. The following describes examples using the checkerboarding approach, in which each individual hologram represents a subset of image spots of the target image arranged in a checkerboard pattern, as described above.

Checkerboarding

In particular, image data comprising a source image may be received and processed by an image processing engine, the source image representing the desired or target image. In some examples, the source image may be the image for processing. Image processing engine may process (e.g. sub-sample) the image to generate a pair of secondary images. The sub-sampling may be based on a checkerboard pattern. A first secondary image may be generated by selecting every other image pixel of the image in a first checkerboard pattern and nulling the remaining pixels (i.e. filling the remaining pixels with a "zero"). A second secondary image may be generated by selecting every other image pixel of the image in a second checkerboard pattern and nulling the remaining pixels (i.e. filling the remaining pixels with a "zero"), where the first checkerboard pattern is opposite to the second checkerboard pattern and vice versa. Thus, first secondary image comprises a first subset of image pixels and second secondary image comprises a second subset of image pixels, wherein the first and second subsets do not overlap and together form the set of image pixels.

In some embodiments of the present disclosure, a single hologram is calculated based on all the image pixels of a desired or target image. The single hologram forms first and second image reconstructions comprising respective subsets of image spots having checkerboard patterns (one subset on each plane) that are perceived as a complete reconstruction of the target image arranged in an array. In other embodiments, a pair of holograms are calculated, wherein each hologram is calculated based on a subset of the image pixels of the target image. Thus, first and second holograms form respective first and second image reconstructions comprising respective subsets of image spots having checkerboard patterns on respective planes. Each subset of pixels comprises a reduced number of pixels. The subset of pixels may be determined using a sampling scheme based on the checkerboarding pattern. In particular, a sampling scheme for checkerboarding selects (or sub-samples) every other image pixel of the image, so that the number of image pixels is reduced by a factor of two. Each image reconstruction on each plane comprises a subset of image spots that form a partial image reconstruction of the target image. By virtue of the checkerboarding approach, the spacing between the image spots in the array on each plane is increased by a factor of two. However, the spatial resolution of the perceived composite image reconstruction (i.e. density of image spots) is not reduced by a factor of two.

In some embodiments, each hologram is a Fourier hologram included in a diffractive pattern, wherein the Fourier hologram is superposed with a lensing function determining the position on the projection axis of the replay field. In these embodiments, the lensing function superposed with the first hologram is different to the lensing function superposed with the second hologram. The first image reconstruction on the first plane and second image reconstruction on the second plane may be the same colour or a different colour. In these embodiments, there may be provided two holographic projection channels per colour. For example, a first red holographic projection channel may be used to form a first red image reconstruction on a first plane and a second red holographic projection channel may be used to form a second red image reconstruction. In some embodiments, red, green and blue image reconstructions are formed on a plurality of planes on the projection axis.

A viewer sees a single complete image reconstruction of each target image corresponding to combined first and second partial image reconstructions. The projected image therefore appears to be a faithful and complete reconstruction of the target image.

The above technique may be used to calculate hologram/s for each target image to be displayed on a different plane of a plurality of planes disposed along a common projection axis as described herein.

Phase-Ramp Function for Interposition of Image Spots

In other embodiments using different holographic projection channels to form the plurality of holographic reconstructions on different planes, image spots of a first (partial) image reconstruction of a target image appear interposed between image spots of a second (partial) image reconstruction of the target image by adding a phase-ramp or software grating function to translate one of the (partial) image reconstructions relative to the other. In other embodiments using different holographic projection channels, different phase-ramp functions are applied such that the image spots of one image reconstruction are (perceived as) interposed between image spots of the other image reconstruction. This helps to prevent any overlap between adjacent image spots formed on the same plane (i.e. it reduces or prevents "pixel crosstalk" or "interpixel interference"). The overlapping of adjacent image spots or image pixels on the same plane can produce interference which appears as grain/noise to the viewer. By forming a first (partial) image reconstruction and second (partial) image reconstruction on different, parallel planes at substantially the same time—this interference can be managed. First and second holograms may be calculated from respective reduced resolution images based on the target image, examples of which are described below.

Sub-Sampling with Kernels

One example sampling scheme is to sample the image pixels of a source image using a so-called "kernel". A kernel may be considered as a moving sampling window that captures, and operates on, a small group of image pixels (e.g. a 4×4 array of pixels). The kernel is incrementally moved to a series of sampling window positions that overlay or capture contiguous (i.e. adjacent and non-overlapping) groups of pixels of the image. It may be said that the kernel operates on contiguous groups of pixels of the source image. For each sampling window position, the kernel operates to determine a single sub-sampled pixel value for the secondary image that is representative of the values of the image pixels captured in the sampling window. For example, a single sub-sampled pixel value for the secondary image may be calculated as an average of the pixel values or an average of weighted pixel values, where the weightings applied to the pixel values are defined by the kernel operation. Thus, the secondary image comprises a sub-sampled or reduced resolution image (i.e. having a reduced number of image pixels). Different kernel-based sampling schemes (e.g. defining different sampling window positions and/or different kernel operations) may be used to determine first and second secondary images for calculating the corresponding hologram or holograms.

Sub-Sampling an Intermediate Image with Warping Correction

Another example sampling scheme is to process the image pixels of a source image to determine an intermediate image, and use the intermediate image as a primary image for sampling to determine secondary images for hologram calculation. For example, the intermediate image may be determined using a displacement map that comprises a displacement value for each pixel of the source image (e.g. in the x- and y-directions) representing the image distortion caused by an optical relay system (extending along the common projection axis) arranged to form each image reconstruction. In particular, an optical relay system of a holographic projector may include optics having optical power and/or an image combiner. The image reconstruction formed by the optical system may be distorted. The distortion may be modelled by considering the individual displacement (x and y) of each pixel. In practical applications such as a head-up display, such distortions may be caused by magnifying optics, freeform optics, windscreens and the like in the optical path from the replay plane to the eye-box. The effect is known as "warping", and so the intermediate image may be called a "warped image" that is determined using a "warping map"

An intermediate image or primary image for processing is derived from the source image in accordance with a warping map or pair of warping maps (e.g. x and y). The intermediate image may be formed by warping the source image. The positions of the pixels in the intermediate image may be determined by establishing the translation in the x- and y-directions caused by warping. This can be determined by computational ray tracing or by using a camera to measure real-world displacements and interpolating the results. The warped image (i.e. an intermediate image rather than the source or target image) is sub-sampled to generate a plurality of secondary images. The secondary images used for calculating the hologram/s effectively compensate for the warping effect because the secondary images are calculated from the intermediate image (i.e. the warped image) not the source image. Accordingly, this technique has the additional advantage of simultaneously compensating for warping caused by an optical relay system of the projector.

The warped image may be sub-sampled using kernels, as described above, or other types of fixed or moving sampling windows. For example, a first group of symmetrically arranged circular sampling windows overlaying substantially the entire warped image may be used to determine the pixel values of a first secondary image. An equivalent second group of symmetrically arranged circular sampling windows, at a position diagonally offset from, but partially overlapping, the first group, may be used to determine the pixel values of a second secondary image. Each sampling window may determine a single sub-sampled pixel value of the corresponding secondary image by applying a weighting to the pixel values (i.e. grey level values) captured in the sampling window and calculating an average of the weighted values. For example, the weighting may assume a Gaussian distribution, such that image pixels at the centre of a sampling window have the highest weighting and pixel values at the edge of a sampling window have the lowest weighting in accordance with a Gaussian distribution.

Sub-Sampling Based on Warping Map

Another example sub sampling scheme is to sub-sample pixels of a high-resolution image to derive a plurality of secondary images, wherein the sampling window positions used for sub-sampling groups of pixels of the sub-sampled image are determined based on warping map(s). For example, a high resolution image may be formed by upscaling a source or target image. A displacement map (or warping map) for the projector may be used to determine the displacement of pixels caused by warping. Accordingly, since the displacement of a pixel in the x- and y-directions caused by the warping effect is known, the displaced positions can be utilized for the purpose of sub-sampling to compensate for the warping effect. Accordingly, this technique derives a plurality of secondary images from the high resolution image by sub sampling groups of image pixels captured by a sampling window (e.g. blocks comprising 4×4 pixel arrays) at displaced pixel positions to compensate for the warping effect.

Thus, the source image is sub sampled using a sampling window at a set of sampling window positions corresponding to the displaced positions, so that a single sub-sampled pixel value for each pixel of each secondary image is derived from the pixel values of the image pixels captured within the corresponding sampling window. In contrast to the other sub sampling techniques, in which the sampling window positions are typically predefined, the sampling window positions are calculated based on a displacement/warping map for the optical relay system.

Accordingly, first and second secondary images may be generated. The first and second secondary images automatically compensate for the warping effect, by virtue of the sampling scheme (i.e. the positions of the sampling windows). First and second holograms may be calculated using the first and second secondary images. Alternatively, one hologram (e.g. a dual-plane hologram such as a Fresnel hologram) may be calculated that holographically reconstructs the first secondary image on a first plane and the second secondary image on a second plane different to the first plane. Thus, the viewer is able to see a faithful reconstruction of the target image on the projection axis of the holographic projector, which is compensated for a warping effect of the optical relay system.

Synchronizing Multiple Checkerboard Image Reconstructions on Multiple Planes

In some embodiments, image reconstructions of a monochromatic target image may be formed on different planes, wherein each image reconstruction comprises image spots of the same colour. During a first display event, a first partial image construction of an image formed on the first plane is a first checkerboard pattern of image spots and a second partial image reconstruction of the image formed on the second plane is a second checkerboard pattern of image spots, as shown in FIG. 6. During a second display event, a complementary first partial image reconstruction of the image formed on the first plane is the second checkerboard pattern of image spots and a complementary second partial image reconstruction of the image formed on the second plane is the first checkerboard pattern of image spots. During each display event, formation of the first and second image reconstructions is synchronized. In some embodiments, the first and second image reconstructions are formed at the same time from the same hologram. In some embodiments, the first and second image reconstructions are formed at the same time in a spatially-separated approach (e.g. by displaying corresponding holograms using two separate holographic channels/spatial light modulators). In other embodiments, the first and second image reconstructions are rapidly formed one after the other in a frame sequential approach as described below (e.g. by sequentially displaying corresponding holograms on a single spatial light modulator at high speed).

Example 1—Single Colour (Red) Images on Two Planes

| Display Event | First plane | Second plane |
| --- | --- | --- |
| 1 | Red - first checker | Red - second checker |
| 2 | Red - second checker | Red - first checker |
| 3 | Red - first checker | Red - second checker |

Example 1

In the scheme of example 1, image spots of the image reconstruction formed in the first plane have the first checkerboard pattern ("first checker") when image spots of the image reconstruction formed on the second plane have the second checkerboard pattern ("second checker") and vice versa. In consequence, image spots of the image reconstruction formed on the first plane are interposed between image spots of the image reconstruction formed on the second plane, when viewed by a viewer. In addition, image spots of image reconstructions formed one after the other (i.e. successively/consecutively) on the first plane alternate between the first and second checkerboard patterns, and image spots of the image reconstruction formed one after the other on the second plane alternate between the second and first checkerboard patterns. The composite image seen by the viewer comprises image reconstructions formed on different planes does not suffer from problems of image pixel interference in each replay field.

Examples 2 and 3—Two Colour (Red and Green) Images on Two Planes

In other embodiments, more complex schemes are contemplated, for example, using different colours to form polychromatic or "full colour" image reconstructions on each plane. Two different approaches to the formation of colour image reconstructions are known. A first approach known as spatially-separated colours, "SSC", uses three spatially-separated arrays of light-modulating pixels to display three single-colour holograms (e.g. red, blue and green holograms) at the same time. A second approach known as frame sequential colour, "FSC", uses all pixels of a common spatial light modulator to display three single-colour holograms in a sequence, which is performed within the integration time of the human eye.

In the following example schemes, the target image is a composite of red, green (and blue) images corresponding to red, green (and blue) image pixels thereof. As described above, separate hologram/s are calculated for each colour or wavelength. In accordance with the present disclosure, image spots formed on a first display plane are interposed between image spots formed on a second display plane during a display event.

| Display Event | First plane | Second plane |
| --- | --- | --- |
| 1 | Red - first checker | Red - second checker |
|   | Green - first checker | Green - second checker |
| 2 | Red - second checker | Red - first checker |
|   | Green - second checker | Green - first checker |
| 3 | Red - first checker | Red - second checker |
|   | Green - first checker | Green - second checker |

Example 2

In the scheme of example 2, red image spots of the image reconstruction formed on the first plane have the first checkerboard pattern when red image spots of the image reconstruction formed on the second plane have the second checkerboard pattern and vice versa. Similarly, green image spots of the image reconstruction formed on the first plane have the second checkerboard pattern when green image spots of the image reconstruction formed on the second plane have the first checkerboard pattern and vice versa. In consequence, red image spots of a first partial image reconstruction of the red image are interposed between red image spots of a second partial image reconstruction of the red image during a display event, and green image spots of a first partial image reconstruction of the green image are interposed between green image spots of a second partial image reconstruction of the green image during a display event. As the skilled person will appreciate, this scheme can be extended to include a third colour—i.e. blue images spots of each of the first and second images on the respective first and second planes.

| Display Event | First plane | Second plane |
| --- | --- | --- |
| 1 | Red - first checker | Red - second checker |
|   | Green - second checker | Green - first checker |
| 2 | Red - second checker | Red - first checker |
|   | Green - first checker | Green - second checker |
| 3 | Red - first checker | Red - second checker |
|   | Green - second checker | Green - first checker |

Example 3

In the scheme of example 3, red image spots on the first plane have the first checkerboard pattern when green image spots on the first plane have the second checkerboard pattern and vice versa. Similarly, red image spots on the second plane have the first checkerboard pattern when green image spots on the second place have the second checkerboard pattern and vice versa. In consequence, red image spots of a first partial image reconstruction of the red image are interposed between green image spots of a second partial image reconstruction of the green image during both subframes of a display event.

Examples 4 and 5—Three Colour (Red, Green and Blue) Images on Two Planes

| Display Event | First plane | Second plane |
| --- | --- | --- |
| 1 | Red - first checker | Red - second checker |
|   | Green - first checker | Green - second checker |
|   | Blue - second checker | Blue - first checker |
| 2 | Red - second checker | Red - first checker |
|   | Green - second checker | Green - first checker |
|   | Blue - first checker | Blue - second checker |
| 3 | Red - first checker | Red - second checker |
|   | Green - first checker | Green - second checker |
|   | Blue - second checker | Blue - first checker |
| 4 | Red - second checker | Red - first checker |
|   | Green - second checker | Green - first checker |
|   | Blue - first checker | Blue - second checker |

Example 4

In the scheme of example 4, red/green image spots on the first plane have the first checkerboard pattern when blue image spots on the first plane have the second checkerboard pattern and vice versa. In addition, blue image spots on the second plane have the first checkerboard pattern when red/green image spots on the second plane have the second checkerboard pattern and vice versa. In consequence, during each display event, red, green and blue image spots formed on the first plane are interposed between respective red, green and blue image spots formed on the second plane.

| Display Event | First plane | Second plane |
| --- | --- | --- |
| 1 | RGB - all first checker | RGB - all second checker |
| 2 | RGB - all second checker | RGB - all first checker |
| 3 | RGB - all first checker | RGB - all second checker |

Example 5

In the scheme of example 5, a plurality of target images are displayed, wherein each target image is a composite of red, green and blue images corresponding to red, green and blue image pixels thereof. Each display event may display a different one of the plurality of target images. Red, green and blue image spots of an image reconstruction of a respective image formed on the first plane have the first checkerboard pattern when red, green and blue image spots of an image reconstruction of the same image formed on the second plane have the second checkerboard pattern and vice versa. In consequence, during each display event, superimposed red, green and blue image spots formed on the first plane are interposed between superimposed red, green and blue image spots formed on the second plane. In this scheme, three separate holographic channels (red, green and blue channels) are required for each of the first and second image reconstructions/planes to enable the simultaneous display of the same colours on different planes.

Figure 8:
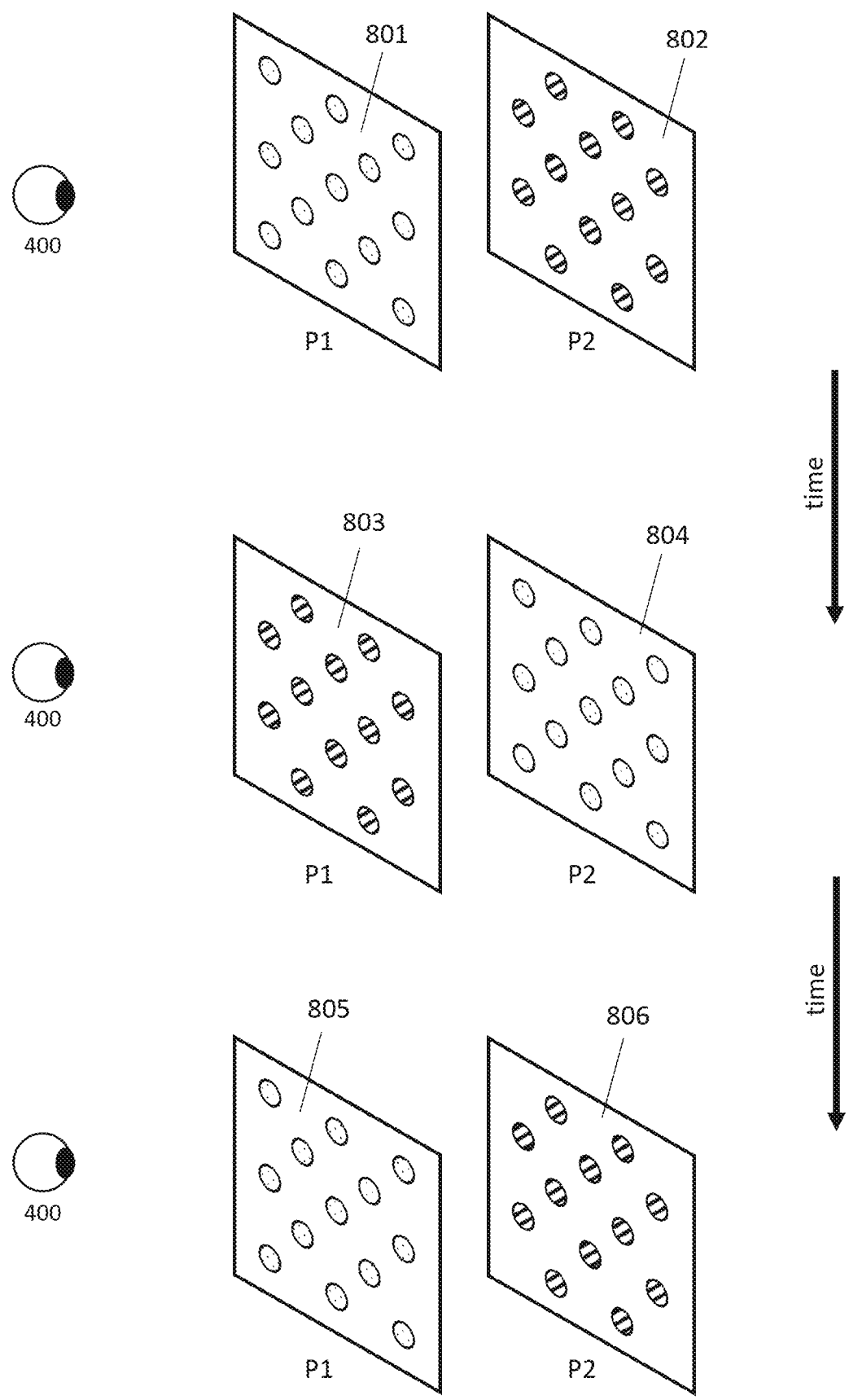
FIG. 8 shows an example sequence of first and second image reconstructions, comprising varying patterns of image spots, formed on respective first and second planes, in accordance with embodiments.

FIG. 8 shows the display of respective first, second and third target images using the scheme of example 5. Thus, during the first display event shown in the top portion of FIG. 8, RGB image spots of a first partial image reconstruction of a first image formed in the first plane P1 have the first checkerboard pattern and RGB image spots of a second partial image reconstruction of the first image formed on the second plane P2 have the second checkerboard pattern. During the second display event shown in the central portion of FIG. 8, RGB image spots of a first partial image reconstruction of a second image formed in the first plane P1 have the second checkerboard pattern and RGB image spots of a second partial image reconstruction of the second image formed on the second plane P2 have the first checkerboard pattern. Finally, during the third display event shown in the bottom portion of FIG. 8, RGB image spots of a first partial image reconstruction of a third image formed in the first plane P1 have the first checkerboard pattern and RGB image spots of a second partial image reconstruction of the third image formed on the second plane P2 have the second checkerboard pattern. In consequence, during each display event, RGB image spots formed on the first plane are interposed between RGB image spots formed on the second plane.

Other schemes for synchronizing colours and checkerboard patterns in accordance with the principles of the present disclosure will be readily apparent to the skilled person.

As described above, the holograms displayed by the spatial light modulator(s) of the projector disclosed herein may be Fourier or Fresnel holograms. In embodiments comprising Fourier holograms, a single Fourier hologram forms an image reconstruction on only one plane. The position of the plane is determined by a variable software lens of the diffractive pattern including the hologram, as described above. In embodiments comprising Fresnel holograms, a single Fresnel hologram can be used to form an image reconstruction on each of a plurality of planes at the same time. In other embodiments, a dual-plane hologram is used to simultaneously form two holographic replay fields on different planes at the same time.

In one particular embodiment, Fourier holography is employed with a variable software lens applied to the diffractive pattern to form image reconstructions of holograms on respective first and second planes. One red, one green and one blue holographic channel is used to selectively form red, green and blue image reconstructions on the respective first and second planes.

System Diagram

Figure 9:
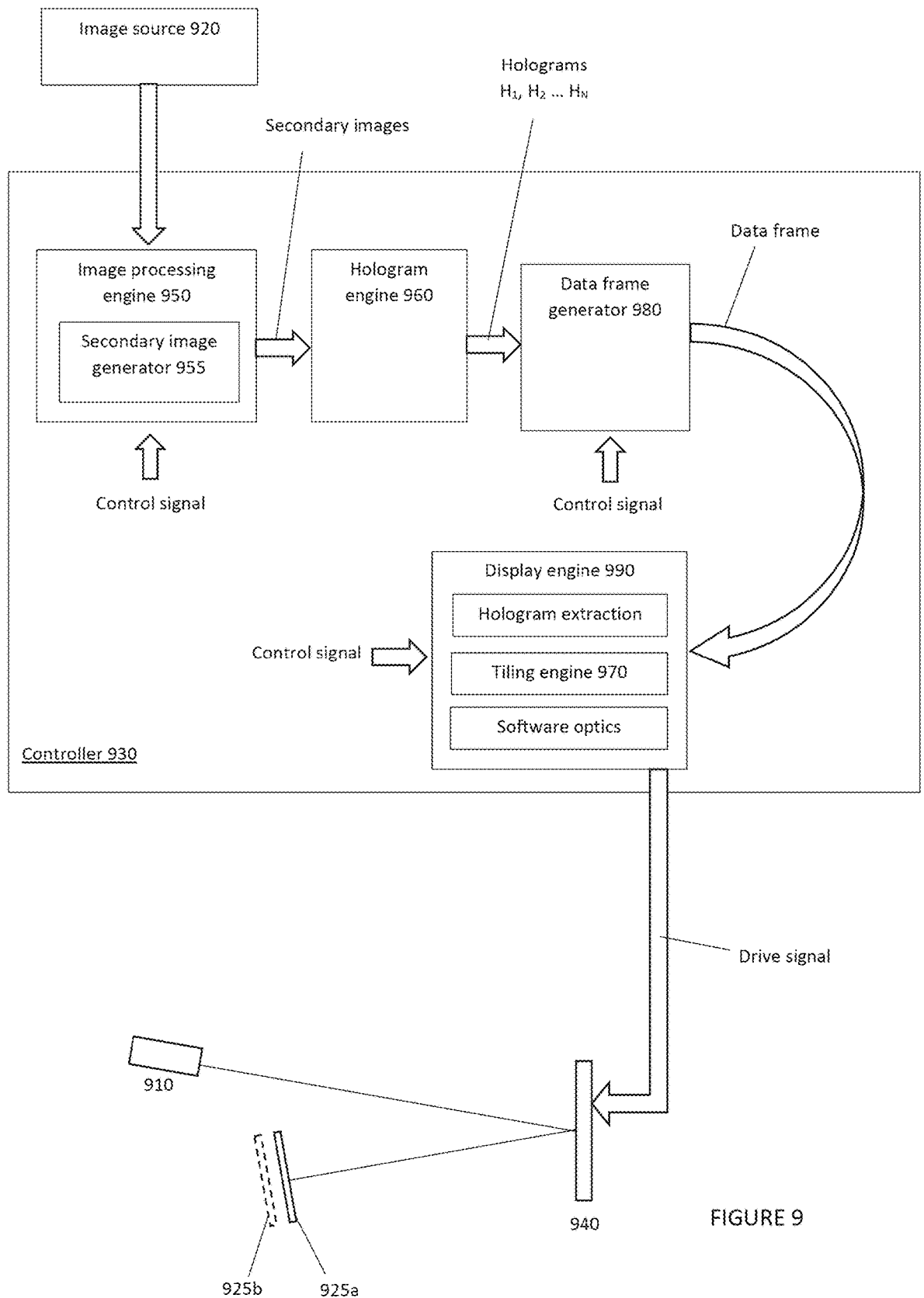
FIG. 9 is a schematic showing a holographic projection system in accordance with embodiments.

FIG. 9 is a schematic showing a holographic system in accordance with embodiments. A spatial light modulator (SLM) 940 is arranged to display holograms received from a controller 930. In operation, a light source 910 illuminates the hologram displayed on SLM 940 and a holographic reconstruction is formed in a replay field on a replay plane 925a. In accordance with embodiments, replay plane 925a may be in free space. A holographic reconstruction may additionally or alternatively be formed on replay plane 925b in accordance with the focal length of the corresponding variable software lens. Controller 930 receives images from an image source 920. For example, image source 920 may be an image capture device such as a still camera arranged to capture a single still image or video camera arranged to capture a video sequence of moving images.

Controller 930 comprises image processing engine 950, hologram engine 960, data frame generator 980 and display engine 990. Image processing engine 950 receives a plurality of source images from image source 920, the source images for display on respective planes in a composite image. Image processing engine 950 may process the received images as described below or may pass the received images directly to the hologram engine 960 for calculating the corresponding hologram.

Image processing engine 950 includes a secondary image generator 955 arranged to generate a plurality of secondary images from each received image (e.g. source image representing a desired or target image) in accordance with a defined scheme, as described herein. Image processing engine 950 may receive a control signal or otherwise determine the scheme for generating the secondary images. Thus, each secondary image comprises fewer pixels than the received image. Image processing engine 950 may generate the plurality of secondary images using the source image as the primary image. The source image may be upscaled version of the target image, or the image processing engine may perform upscaling as described herein. Alternatively, image processing engine 950 may process the source image to determine an intermediate image, and use the intermediate image as the primary image. For example, the intermediate image may be an "warped image", as described herein. The warped image may be determined using a displacement map that comprises a displacement value for each pixel of the source image (e.g. in the x- and y-directions) representing the image distortion caused by an optical relay system arranged to image of each holographic reconstruction. Image processing engine 950 may generate the plurality of secondary images by sub-sampling (or under-sampling) the primary image, as described herein. Image processing engine 950 may determine a first secondary image and a second secondary image, wherein the pixel value of each pixel of a first secondary image is calculated from a first group of pixels of the primary image and the pixel value of each pixel of a second secondary image is calculated from a second group of pixels of the primary image. In some implementations, the sampling window used to select the second group of pixels is offset from, and/or partially overlaps, the sampling window used to select the first group of pixels. In other implementations, the sampling window positions, in each case, may be arranged in a checkerboard pattern, where different checkerboard patterns are used for each secondary image. In some implementations, the sampling window positions for selecting the first and second groups of pixels are determined using a displacement map. Image processing engine 950 passes the plurality of secondary images to hologram engine 960.

Hologram engine 960 is arranged to determine a hologram corresponding to each image received from image processing engine 950, as described herein. In addition, hologram engine is arranged to determine, for each image, a diffractive pattern including the hologram and, optionally, a software lens and/or grating/phase-ramp function, as described herein. Hologram engine 960 passes the diffractive patterns to data frame generator 980. Data frame generator 980 is arranged to generate a data frame (e.g. HDMI frame) comprising the plurality of diffractive patterns, as described herein. In particular, data frame generator 980 generates a data frame comprising hologram data for each of the plurality of holograms. Data frame generator 980 passes the data frame to display engine 990. Display engine 990 is arranged to display each of the plurality of holograms, in turn, on SLM 940. Display engine 990 comprises hologram extractor 992, tiling engine 970 and software optics 994. Display engine 990 extracts each hologram from the data frame using hologram extractor 992 and tiles the hologram according to a tiling scheme generated by tiling engine 970, as described herein. In particular, tiling engine 970 may receive a control signal to determine the tiling scheme, or may otherwise determine a tiling scheme for tiling based on the hologram. Display engine 990 may optionally add a phase ramp function (software grating function) using software optics 994, to translate the position of the replay field on the replay plane, as described herein. Accordingly, for each hologram, display engine 990 is arranged to output a drive signal to SLM 940 to display each diffractive pattern including a hologram of the plurality of holograms on a respective plane, according to a corresponding tiling scheme, in a synchronised scheme, as described herein.

Controller 930 may dynamically control how secondary image generator 955 generates secondary images, as described herein. Controller 930 may dynamically control the refresh rate for holograms. As described herein, the refresh rate may be considered as the frequency at which a hologram is recalculated by hologram engine, from a next source image in a sequence received by image processing engine 950 from image source 920. As described herein, dynamically controllable features and parameters may be determined based on external factors indicated by a control signal. Controller 930 may receive control signals relating to such external factors, or may include modules for determining such external factors and generating such control signals, accordingly.

As the skilled person will appreciate, the above-described features of controller 930 may be implemented in software, firmware or hardware, and any combination thereof.

Accordingly, there is provided a projector arranged to form images viewable from a viewing area. The projector comprises at least one spatial light modulator and at least one light source (per colour). Each spatial light modulator is arranged to display a computer-generated diffractive pattern. Each corresponding light source is arranged to illuminate the spatial light modulator during display such that a first image is formed on a first plane and a second image is formed on a second plane. The first plane is spatially-separated from the spatial light modulator by a first propagation distance and the second plane is spatially-separated from the spatial light modulator by a second propagation distance different to the first propagation distance. The first image comprises first image spots arranged in a first pattern and the second image comprises second image spots arranged in a second pattern. The first image spots and the second image spots are interleaved (i.e. spatially interposed and offset/separated in two dimensions (x, y) of the image and in the third dimension (z) parallel to the projection axis) such that the first image spots and second spots are visible at the same time from the viewing area. The computer-generated diffractive pattern may be a Fresnel hologram arranged to form the first image and second image at the same time. Alternatively, the computer-generated diffractive pattern may comprise two spatially separated Fourier holograms, each combined (i.e. superposed/added) with a respective lensing function defining the respective propagation distance to the respective (replay) plane. That is, a first Fourier hologram is displayed on a first subset of pixels of a spatial light modulator (e.g. a first half) and a second Fourier hologram is displayed, at substantially the same time as the first Fourier hologram, on a second subset of pixels of the spatial light modulator (e.g. a second half).

In some embodiments, an image processing engine is arranged to under-sample a first primary image for projection in accordance with a first sampling scheme to form a first secondary image comprising pixels arranged in a first checkerboard pattern. The image processing engine is further arranged to under-sample the first primary image for projection in accordance with a second sampling scheme to form a second secondary image comprising pixels arranged in a second checkerboard pattern. The second sampling scheme may be different to the first sampling scheme and the second checkerboard pattern may be opposite to the first checkerboard pattern. A hologram engine is arranged to determine a first hologram from the first secondary image; and determine a second hologram from the second secondary image. Alternatively, the hologram engine may be arranged to determine (e.g. calculate) a single hologram (e.g. Fresnel hologram) that encodes the first secondary image and second secondary image. A light source is arranged to illuminate a spatial light modulator such that a first image reconstruction corresponding to the first hologram is formed on a first plane and a second image reconstruction corresponding to the second hologram is formed on a second plane at the same time. The first plane is spatially-separated from the spatial light modulator by a first propagation distance and the second plane is spatially-separated from the spatial light modulator by a second propagation distance. The second propagation distance is different to the first propagation distance.

The first image reconstruction comprises first image spots arranged in a first pattern and the second image reconstruction comprises second image spots arranged in a second pattern. The first image spots are interposed between the second image spots, such that the first image spots and second image spots are both visible at the same time from a viewing area.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented to increase image quality.

Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

In embodiments, only the primary replay field is utilised to form image reconstructions on each plane and the system comprises physical blocks, such as baffles, arranged to restrict the propagation of the higher order replay fields through the system.

As described herein, in embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A projector arranged to form a plurality of image reconstructions on different planes disposed on a common projection axis, wherein the projector comprises:
   a hologram engine arranged to determine a plurality of holograms corresponding to at least one image for image reconstruction, and, for each hologram of the plurality of holograms, to form a diffractive pattern including the corresponding hologram;
   a display engine arranged to display each diffractive pattern and receive light such that an image reconstruction corresponding to each hologram is formed on a plane of the plurality of different planes, wherein each image reconstruction comprises image spots arranged in a pattern, and
   wherein image spots of a first image reconstruction formed on a first plane are interposed between image spots of a second image reconstruction formed on a second plane.

2. A projector as claimed in claim 1 wherein the first image reconstruction and second image reconstruction are formed at substantially the same time.

3. A projector as claimed as claimed in claim 1 wherein the first image reconstruction is a partial reconstruction of a target image and the second image reconstruction is a partial reconstruction of the target image.

4. A projector as claimed in claim 1 wherein the image spots of the first image reconstruction are arranged in a first pattern and the image spots of the second image reconstruction are arranged in a second pattern, wherein the first pattern is opposite to the second pattern.

5. A projector as claimed in claim 4 arranged to form a sequence of image reconstructions on the first plane by alternating between image spots arranged in the first pattern and image spots arranged in the second pattern and, in synchronization, form a sequence of image reconstructions on the second plane by alternating between image spots arranged in the second pattern and image spots arranged in the first pattern.

6. A projector as claimed in claim 5 wherein the successive image reconstructions of the sequence of image reconstructions on the first plane are a different colour.

7. A projector as claimed in claim 1 wherein the first pattern is a first checkerboard pattern and the second pattern is a second checkerboard pattern.

8. A projector as claimed in claim 1 wherein, at any point in time, the colour of the image spots formed on the first plane is different to colour of the image spots formed on the second plane.

9. A projector as claimed in claim 1 wherein the first image reconstruction is a first holographic reconstruction and the second image reconstruction is a second holographic reconstruction.

10. A projector as claimed in claim 1 further comprising:
    an image processing engine arranged to receive a plurality of source images comprising image pixels for projection, and process each source image in accordance with a sampling scheme in order to reduce the number of image pixels having a pixel value before the source image is processed by the hologram engine;
    wherein each diffractive pattern formed by the hologram engine further includes a lens function having a focal length, wherein the focal length of the lens function determines the plane of the image reconstruction;
    wherein the pattern of image spots of each image reconstruction formed by the display engine is determined by the corresponding sampling scheme,
    wherein a first sampling scheme associated with the first image reconstruction is different to a second sampling scheme associated with the second image reconstruction such that the image spots of the first image formed on the first plane are interposed between the image spots of the second image formed on the second plane.

11. A projector as claimed in claim 10 wherein the image processing engine is further arranged to upscale each source image before processing in accordance with a sampling scheme.

12. A projector as claimed in claim 10 wherein the first sampling scheme comprises nulling alternate pixel values in accordance with a first checkerboard pattern and the second sampling scheme comprises nulling alternative pixel values in accordance with a second checkerboard pattern, wherein the first checkerboard pattern is opposite to the second checkerboard pattern.

13. A projector as claimed in claim 10 wherein each sampling scheme comprises averaging pixel values within a sampling window at a plurality of sampling window positions, optionally, wherein the averaging is a weighted averaging based on the position of the pixels within the sample window, further optionally, wherein the weighting given to each pixel value in the respective sampling window decreases with distance from the centre of the sampling window.

14. A projector as claimed in claim 13 wherein the first sampling scheme comprises a first set of sampling window positions and the second sampling scheme comprises a second set of sampling window positions, wherein the first set of sampling window positions is diagonally offset from the second set of sampling window positions.

15. A projector as claimed in claim 14 wherein the first set of sampling window positions partially overlap the second set of sampling window positions.

16. A projector as claimed in claim 1 wherein each diffractive pattern formed by the hologram engine further includes a phase-ramp function, wherein the ramp gradient of a first phase-ramp function associated with the first image reconstruction is different to the ramp gradient of a second phase-ramp function associated with the second image reconstruction in order to provide a displacement between the image spots of the first image reconstruction relative to the image spots of the second image reconstruction.

17. A projector as claimed in claim 16 wherein the difference between the ramp gradient of the first phase-ramp function and the ramp gradient of the second phase-ramp function is such that the image spots of the first image formed on the first plane are interposed between the image spots of the second image formed on the second plane.

18. A head-up display comprising the projector of claim 1 wherein the first plane contains near-field image content and the second plane contains far-field image content.

19. A method for forming a plurality of image reconstructions on different planes disposed on a common projection axis, the method comprising:
- determining a plurality of holograms corresponding to at least one image for image reconstruction;
- forming, for each hologram of the plurality of holograms, a diffractive pattern including a corresponding hologram;
- displaying each diffractive pattern using a display engine;
- illuminating the display engine with light and forming an image reconstruction corresponding to each hologram on a plane of the plurality of different planes,
- wherein each image reconstruction comprises image spots arranged in a pattern, and wherein image spots of a first image reconstruction formed on a first plane are interposed between image spots of a second image reconstruction formed on a second plane.

20. A method as claimed in claim 19 comprising forming the first image reconstruction and second image reconstruction at substantially the same time.

* * * * *